US006443253B1

(12) United States Patent
Whitehead et al.

(10) Patent No.: US 6,443,253 B1
(45) Date of Patent: Sep. 3, 2002

(54) THERMAL MANAGEMENT SYSTEM FOR AN ELECTROCHEMICAL ENGINE

(75) Inventors: Lee Curtis Whitehead, Middleport; Ronald J. Daum, Bloomfield, both of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/644,506

(22) Filed: Aug. 24, 2000

(51) Int. Cl.[7] .............................................. B60K 11/00
(52) U.S. Cl. .................... 180/68.1; 180/68.4; 180/68.2; 165/41; 165/127
(58) Field of Search ............................. 180/68.1, 68.2, 180/68.3, 68.4; 165/41, 44, 51, 127

(56) References Cited

U.S. PATENT DOCUMENTS

| | | | |
|---|---|---|---|
| 3,595,029 A | * | 7/1971 | Lende, Jr. ...................... 62/244 |
| 5,025,986 A | * | 6/1991 | Burst ..................... 237/12.3 A |
| 6,167,976 B1 | * | 1/2001 | O'Neill et al. ............. 180/68.1 |
| 6,195,999 B1 | * | 3/2001 | Arnold et al. ................ 60/649 |
| 6,223,843 B1 | * | 5/2001 | O'Connell et al. ........ 180/65.3 |

FOREIGN PATENT DOCUMENTS

JP        58101824 A  *  6/1983  ................ 180/68.1

* cited by examiner

Primary Examiner—Christopher P. Schwartz
Assistant Examiner—Mariano Sy
(74) Attorney, Agent, or Firm—Laura C. Hargitt

(57) ABSTRACT

A thermal management system for an electrochemical engine in a vehicle comprises a coolant pump and a radiator. The radiator is oriented substantially parallel to a plane defined by longitudinal and lateral vehicle axes and defined by an inlet face as the upper surface and an outlet face as the lower surface. The radiator is packaged in a rear underbody compartment of the vehicle to allow a large cooling surface area. An air duct delivers air from outside the vehicle to the inlet face of the radiator. A fan forces air from the air duct through the radiator. A coolant circuit extends between a fuel cell stack of the electrochemical engine, the coolant pump, and the radiator.

6 Claims, 5 Drawing Sheets

THERMAL MANAGEMENT SYSTEM FOR AN ELECTROCHEMICAL ENGINE

TECHNICAL FIELD

The present invention relates to a thermal management system for an electrochemical engine in a vehicle.

BACKGROUND OF THE INVENTION

Thermal management of an electrochemical engine presents several important considerations and challenges as compared to a conventional internal combustion engine. First, in an internal combustion engine, waste heat is managed about equally through both an exhaust gas stream and through a flow of air-cooled engine coolant. In comparison, an electrochemical engine manages most of its waste heat through air-cooled engine coolant. Second, an internal combustion engine typically operates at 120° C., where an electrochemical engine operates at the lower temperature of 80° C. Therefore the heat transfer between the coolant and air in a thermal management system of an electrochemical engine is about one-half that of an internal combustion engine due to the smaller temperature differential between the waste heat and ambient at 38° C. These two considerations in combination may necessitate a threefold increase in the cooling air flow rate through the radiator and an order of magnitude increase in its associated fan power. A thermal management system meeting such requirements may be too large to be packaged in the conventional location at the front of the vehicle.

SUMMARY OF THE INVENTION

The present invention is directed to a thermal management system for an electrochemical engine in a vehicle. In this thermal management system, a radiator and associated fan are packaged in the rear of the vehicle, independent of the packaging location of the electrochemical engine. The rear of the vehicle may have more available packaging volume to accommodate a large face area radiator, which allows high air flow with lower fan power requirements.

To take advantage of the surface area available in the rear of the vehicle, the radiator may be mounted flat, horizontally behind the rear axle between the rear frame rails. Air inlet ducts are designed to preserve cargo and passenger compartment volume and to provide smooth ductwork to the radiator such as by louvered panels or air scoops near the rear windows. The fans may be mounted to either force air in or pull air through the radiator.

Akin to the first embodiment, the radiator is packaged to take advantage of the surface area available in the rear of the vehicle. Here the radiator is mounted at an incline between the roof inner and outer panels. Air inlets in the roof outer panel draw air into an inlet air duct, forward of the radiator, allowing air to flow through the radiator and exit an air duct outlet rearward of the radiator.

The thermal management system of the present invention provides sufficient air cooling of the fuel cell stack-heated coolant, while having minimal impact on overall vehicle packaging.

DESCRIPTION OF THE PREFERRED EMBODIMENT

Figure 1:
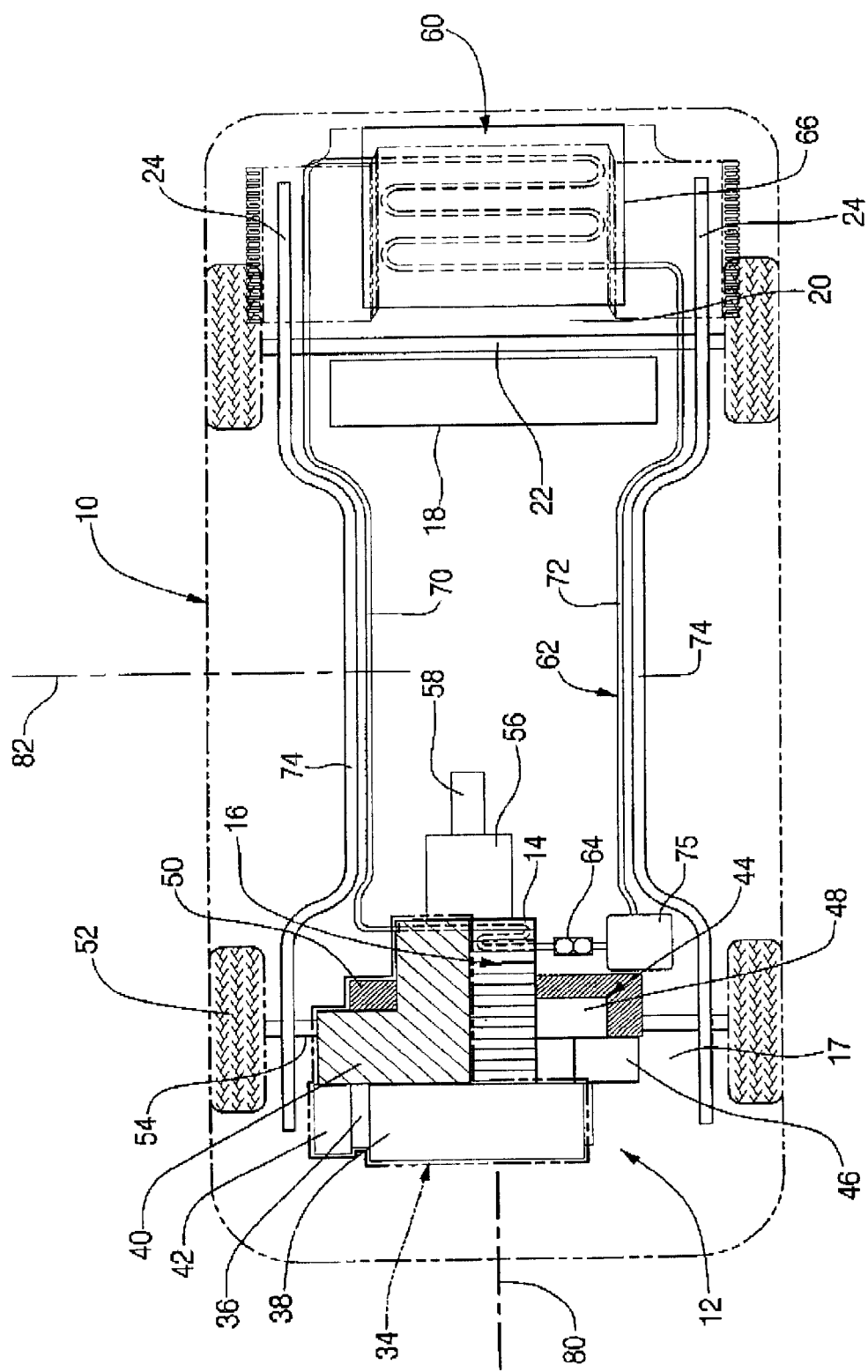
FIG. 1 is a schematic plan view of a vehicle embodying an electrochemical engine and associated thermal management system of the present invention.

With reference to FIG. 1, a vehicle 10 includes an electrochemical engine (ECE), shown generally as 12, as a source of power. By operating the ECE 12, electricity is generated by a known electrochemical reaction between hydrogen and oxygen within fuel cells 14 of a fuel cell stack 16. The fuel cell stack 16 is shown as being located in a front rail compartment 17.

To generate hydrogen for the electrochemical process, fuel may be reformed on board the vehicle 10 where such fuels include gasoline, methanol, diesel, etc. The fuel reformation process and associated hardware required will now be described as shown in FIG. 1. Fuel is stored in a fuel tank 18, shown here in the rear underbody compartment 20 of the vehicle 10 forward of the rear axle 22 in a conventional manner known in the art. The rear underbody compartment 20 is defined by the volume between the rear frame rails 24 and below the vehicle floor 26. The vehicle floor 26 in FIG. 2 includes a seat floor portion 28 which supports the occupant seats and a cargo floor portion 30 to support items stored in the rear storage space 32.

Fuel is delivered to the ECE 12 and in particular to a hydrogen generator, shown generally as 34, which includes a combustor 36 and a reformer 38. The combustor 36 generates and supplies heat to the reformer 38, wherein the reformer partially oxidizes and reforms the fuel to produce a hydrogen-containing gas. To reduce residual carbon monoxide in the reformed product, the hydrogen generator 34 may further include one or more carbon monoxide reduction reactors 40 where one may be a preferential oxidation reactor through which the hydrogen-containing gas is passed. If cooling is necessary for preparing the final product gas, then a cooler 42 may be included as part of the hydrogen generator 34.

As an alternative to reforming hydrogen on-board as described above, hydrogen for the electrochemical process may be stored on-board the vehicle in a suitable storage tank. The hydrogen may be stored either in its gaseous state, liquid state, or in a captured solid state by a hydrogen-retention material contained within the storage tank. Hydrogen-retention material refers to a material, which is capable of reversibly taking-up and storing hydrogen at a storage temperature, and releasing it at a release temperature, which is greater than the storage temperature. Examples of hydrogenretention material include metals such as sodium-aluminum, lanthanum-nickelide, titanium, or nickel, which react with and store the hydrogen as a hydride of the metal.

In either the reformation case or the hydrogen storage case, hydrogen-containing gas is delivered under pressure to the fuel cell stack 16 through an anode, not shown, to create hydrogen protons.

To supply oxygen to the fuel cell stack 16 for the electrochemical process, the ECE 12 includes an air generator 44 such as an air compressor 46 and optionally a cathode humidifier 48 to provide a humidified oxidant supply to a cathode, not shown, of the fuel cells 14. The cathode is separated from the anode by an electrolyte.

Electricity and heat are generated in the fuel cell stack 16 by processing the hydrogen and oxygen in a manner known in the art. The generated electricity may power vehicle accessories and an electric drive motor 50, operatively connected to a pair of front vehicle wheels 52 such as by a front axle 54. A voltage converter 56 may operate between the fuel cell stack 16 and the drive motor 50 to adjust the voltage of the generated electricity. An engine controller 58 may be used to monitor and schedule fuel delivery to control the electrochemical process. Such auxiliary components may be packaged in the floor pan chassis tunnel or within the engine compartment.

To manage the heat generated by the ECE 12 which operates at about 80° C., a thermal management system 60 is provided. The thermal management system 60 includes a coolant flow circuit 62, which extends through the fuel cell stack 16, a coolant pump 64, and a radiator 66. A radiator inlet line 70 of the coolant flow circuit 62 delivers ECE-warmed coolant to the radiator 66 and a radiator outlet line 72 carries radiator-cooled coolant back to the fuel cell stack 16. The radiator lines 70, 72 may be packaged inside rear and side frame rails 24, 74 of the vehicle for durability and packaging convenience. The coolant pump 64 is mounted low in the thermal management system 60 to avoid vapor accumulation, typically near the fuel cell stack 16.

The coolant flow circuit 62 may include a coolant reserve tank 75, which commonly provides the functions of expansion space for hot coolant, storage of reserve coolant, separation of vapor from the coolant, and venting to ensure the coolant lines are completely filled with liquid under all operating conditions. Therefore the coolant tank 75 is generally mounted at or near the highest point in the thermal management system 60.

Figure 3:
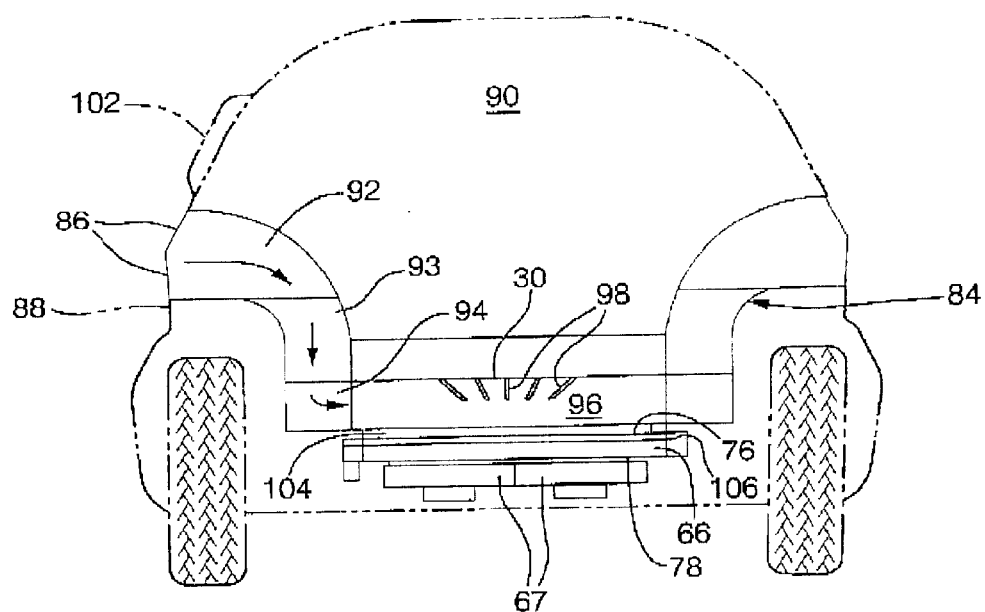
FIG. 3 is a rear view of a portion of the thermal management system.
Figure 4:
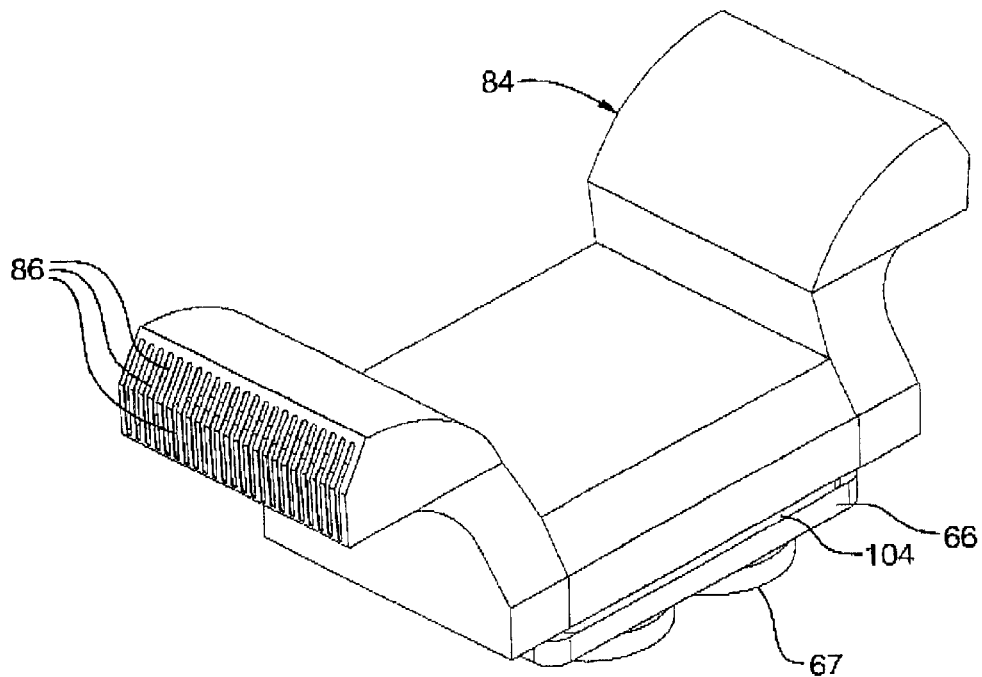
FIG. 4 is an isometric view of FIG. 3.

As best shown in FIGS. 3 and 4, the radiator 66 is a heat exchanger designed to dissipate heat, which the coolant has absorbed from the fuel cell stack 16. The radiator 66 is defined by an inlet face 76 and an outlet face 78 with a radiator core of coolant tubes therebetween, not shown. One or more associated fans 67 draw cooling air through the radiator 66. Therefore, one significant factor of cooling capacity is the surface area of the radiator faces with larger faces having more area for air flow. A second factor is the force capacity of the fan.

The radiator 66 is packaged in the rear of the vehicle 10 and oriented such that the radiator faces 76, 78 generally lie in the plane defined by the longitudinal and lateral axes 80 and 82, respectively in FIG. 1, of the vehicle to maximize the size of the cooling surface area.

In the first embodiment shown in FIGS. 1 through 5, the radiator 66 is mounted generally horizontally in the rear underbody compartment 20 between the rear frame rails 24 and below the cargo floor 30. A substantial portion of the radiator 66 is longitudinally rearward of the rear axle 22. The inlet face 76 of the radiator 66 in this position is the upper face and the outlet face 78 is the lower face.

Figure 5:
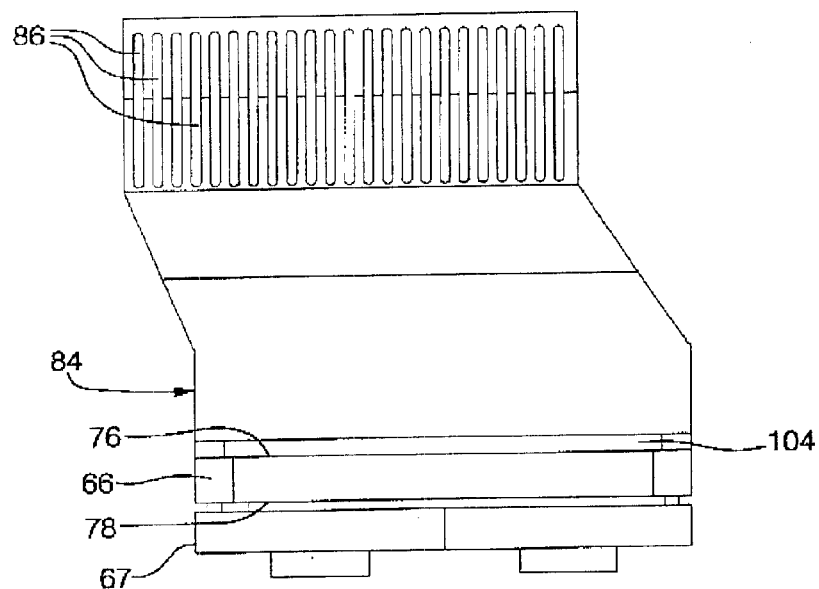
FIG. 5 is a side view of FIG. 3.

This position of the radiator 66 in the rear underbody compartment 20 provides maximum surface area for exposure to cooling air flow. To direct cooling air flow from outside the vehicle 10 to the upper inlet face 76 of the radiator 66, one or more air ducts 84 are provided as best shown in FIGS. 3–5. Air duct inlets 86 open through rear body panels 88 to the air ducts 84 on the interior side of the body panels. The ducts 84 are sealed from the interior 90 of the vehicle to isolate the conditioned cabin compartment from the outside cooling air. The ducts 84 follow the shape of the vehicle. As shown in FIG. 3, the duct has a generally horizontal inlet portion 92, which flows into a generally vertical duct portion 93. The vertical duct portion transitions to a horizontal delivery portion 94.

A plenum chamber 96, provided between the cargo floor 30 and the upper, inlet face 76 of the radiator, is in flow communication with the duct 84, and more particularly the horizontal delivery portion 94, for distributing inlet air to the inlet face of the radiator 66. Air flows through the ducts 84 to the plenum chamber 96 where it is distributed across the upper inlet face 76 of the radiator 66. In small-volume plenum chambers 96, turning vanes 98 or honeycomb may be used to direct and turn the flow from generally horizontal to downwardly into the radiator 66. Air flows through the radiator 66 from the upper, inlet face 76 to the lower, outlet face 78 and exits through the bottom of the vehicle, referred to generally as air outlet. As shown here, four fans 67 are located below the lower face 78 of the radiator to pull air through the radiator 66. Alternatively, the fans may be located above the upper face 76 of the radiator to push air flow from the air ducts, through the radiator 66.

The ducts 84 are designed to handle the volume of air flow required, while being integrated into the rear body structure so as to minimize the intrusion on passenger or cargo space. Preferably there is an air duct 84 and associated inlet 86 on both sides of the vehicle. As a starting point, the total cross-sectional duct area should be about one-half the radiator surface area. Therefore if two ducts are employed, each would be sized as one-fourth the radiator surface area.

Figure 2:
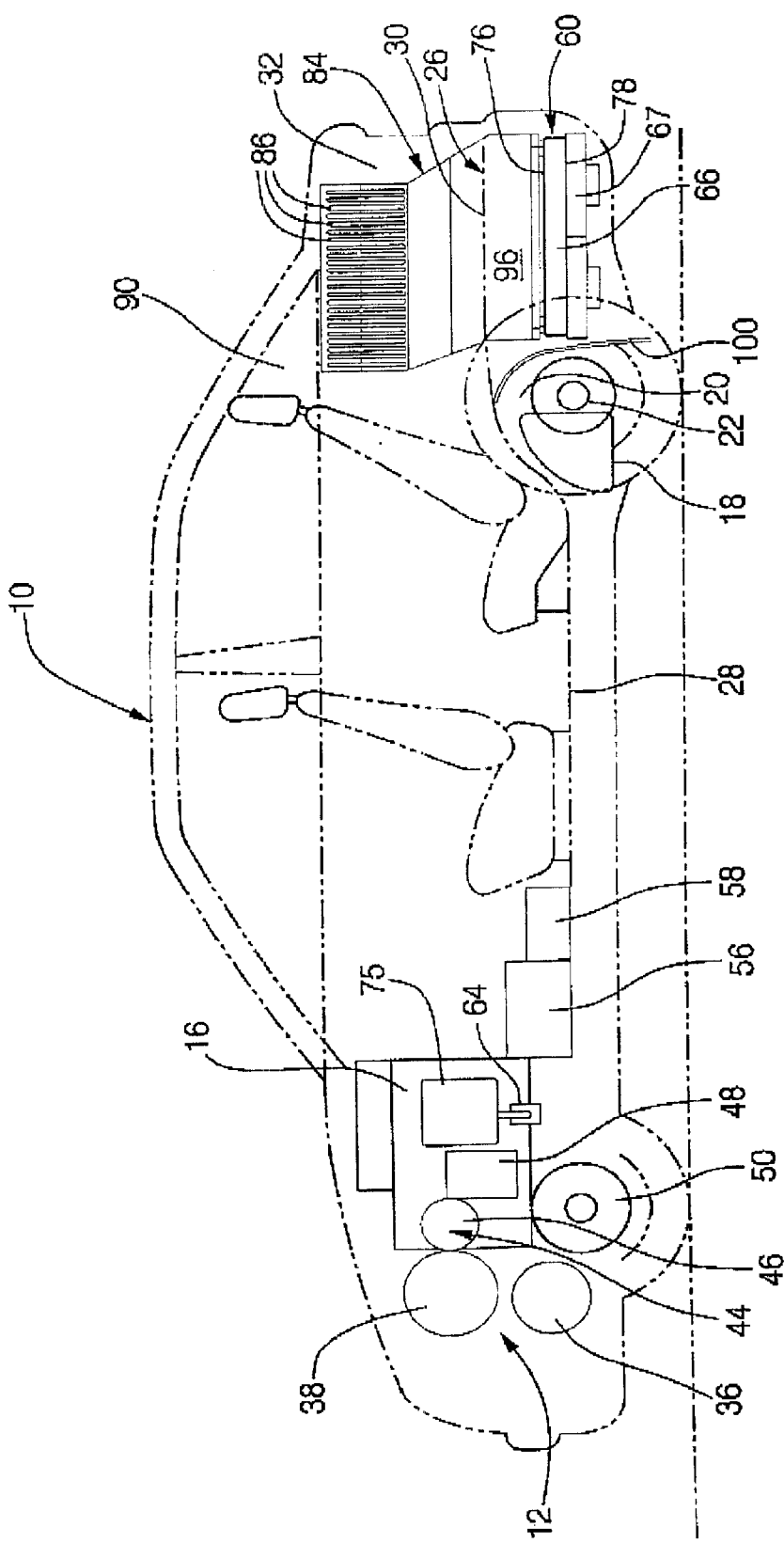
FIG. 2 is a schematic side view of the vehicle of FIG. 1.

Air pressure at the air duct inlets 86 is neutral or mildly positive as compared to low pressure area behind the vehicle for air exiting the radiator 66. To further accentuate this positive pressure differential, aerodynamic devices may be included. For example, an air dam 100 may be included below the vehicle at the forward lower edge of the radiator to enhance the low pressure as shown in FIG. 2. To increase the pressure at the air duct inlet 86, an air scoop 102 may be included on the exterior of the side body panel as shown in FIG. 3.

An auxiliary, lower temperature coolant circuit may also be provided as part of the thermal management system to maintain auxiliary devices such as electronic controls, motors, and condensers at a lower operating temperature (e.g. 55° C.) than the fuel cell stack (e.g. 80° C.). The auxiliary circuit may include an auxiliary, smaller radiator 104 packaged adjacent the radiator 66 for the ECE. As shown in FIG. 3, the auxiliary radiator 104 is positioned in series before the radiator 66 and the fans 67. Air flowing through air duct 84 is delivered to flow first through the auxiliary radiator 104 and then through the radiator 66. Further a condenser 106, shown in FIG. 3, which requires a large flow face such as a cabin air conditioner condenser, may be arranged in the air flow path adjacent the auxiliary radiator 104. The auxiliary radiator is shown to be ahead of the condenser in the air flow path, but the order is dependent on which component requires the cooler air flow in a particular design.

Figure 6:
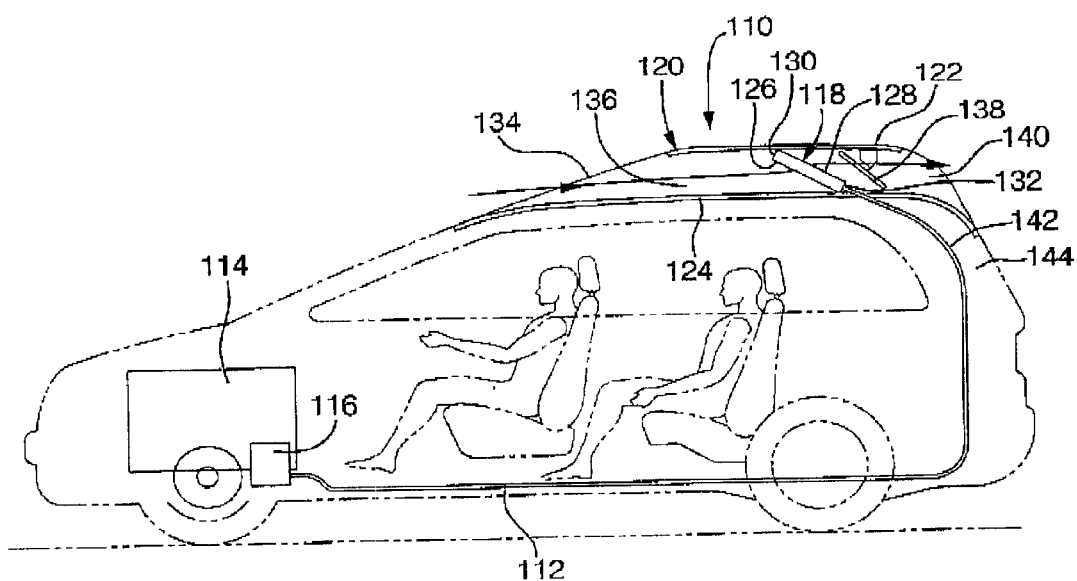
FIG. 6 is a side view of a vehicle embodying a second embodiment of the present invention.
Figure 7:
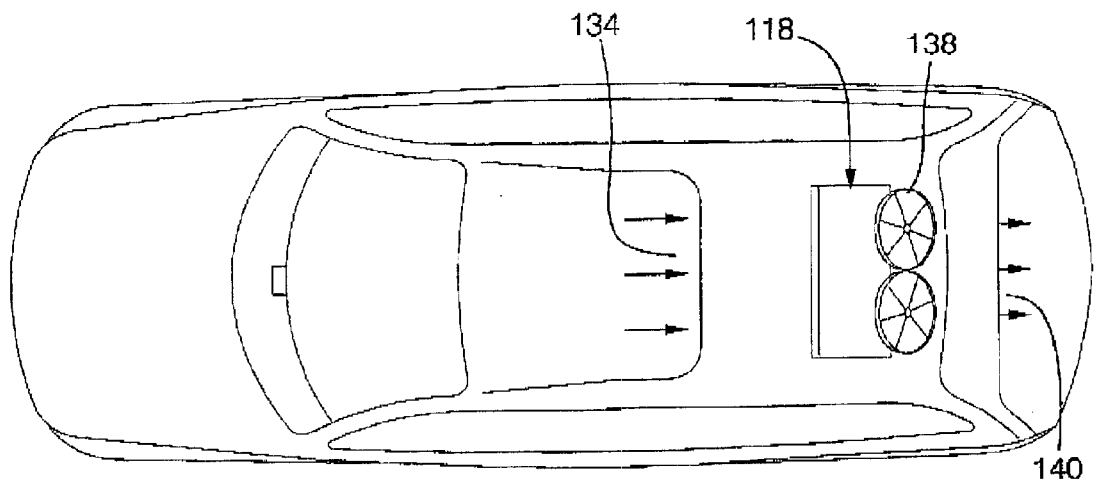
FIG. 7 is a plan view of FIG. 6.

In a second embodiment shown in FIGS. 6 and 7, a thermal management system 110 includes a coolant flow circuit 112, which extends through a fuel cell stack 114, a coolant pump 116, and a radiator 118 as previously described. In this embodiment, the radiator 118 is packaged in the roof panel 120 of the vehicle between a roof outer panel 122 and a roof inner panel 124. The radiator 118 includes an inlet face 126 and an outlet face 128 with a radiator core of coolant tubes therebetween, not shown. In order for air to flow through the radiator 118 from the inlet 126 to the outlet face 128, the radiator may be inclined relative to the generally horizontal roof panel 120. As shown in FIG. 6, since the forward edge 130 of the radiator 118 is inclined upwardly from the roof inner panel 124, the inlet face 126 is the lower surface of the radiator and the outlet face 128 is the upper surface. Alternatively (although not shown), if the rearward edge 132 of the radiator 118 is inclined upwardly from the roof inner panel 124, the inlet face 126 is the upper surface.

To direct cooling air flow from outside the vehicle to the inlet face 126, air inlets 134 in the roof outer panel 122, forward of the radiator 118, open into an inlet air duct 136 interposed between the roof inner and outer panels 124, 126. The inlet air duct 136 carries fresh air from the air inlets 134 to the radiator inlet face 126.

One or more fans 138 are attached directly to the outlet face 128 to pull air through the radiator 118 as shown in FIGS. 6 and 7. Alternatively the fans 138 may be located upstream, to push or force air through the inlet face 126.

Figure 8:
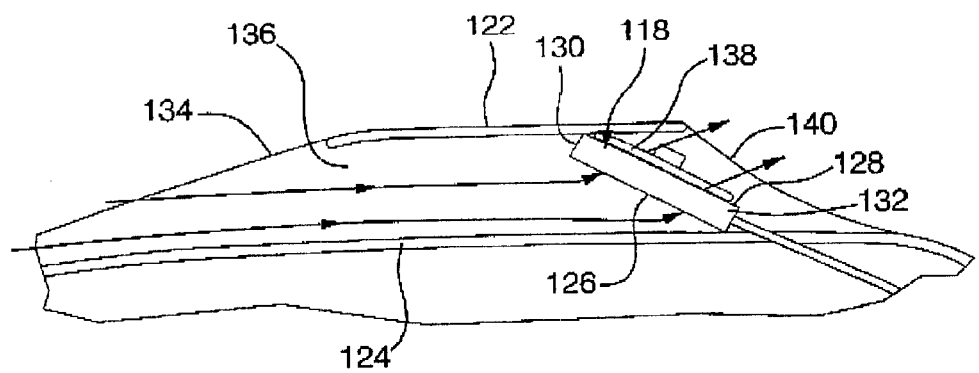
FIG. 8 is a modified portion of the side view of FIG. 6.

An outlet air duct 140 may carry radiator-warmed air outside the vehicle. The cross-sectional area of the outlet duct 140 may be larger than the inlet duct 136 to accommodate the greater volume flow of the heated air. The outlet duct 140 may be removed or abbreviated as shown in FIG. 8 such that the outlet duct extends to provide a sufficient overhang over the radiator 118 and associated fan 138 to protect them from environmental concerns such as ice or rocks.

The coolant flow circuit 112 also includes radiator coolant lines 142 packaged in body pillars 144 of the vehicle to carry fuel cell stack-warmed coolant up to the radiator 118 and radiator-cooled coolant back to the fuel cell stack 114.

Therefore the present invention is a thermal management system which takes into consideration the unique thermal challenges of an electrochemical engine as compared to an internal combustion engine. Depending on the particular vehicle architecture, packaging the radiator in the rear of the vehicle may approximately double the surface area available for cooling as compared to a conventional front-of-vehicle location. Larger face area radiators allow high air flows with lower fan power requirements.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed:

1. A thermal management system for an electrochemical engine in a vehicle, comprising:

a coolant pump, a radiator oriented substantially parallel to a plane defined by longitudinal and lateral vehicle axes and having an inlet face as the upper surface and an outlet face as the lower surface, said radiator packaged in a rear underbody compartment of said vehicle to allow a large cooling surface area, an air duct to deliver air from outside said vehicle to said inlet face of said radiator, said radiator having an associated fan to force air from said air duct through said radiator, and a coolant circuit extending between a fuel cell stack of said electrochemical engine located in a front rail compartment, said coolant pump, and said radiator and including a radiator inlet line and a radiator outlet line packaged in a frame rail of said vehicle.

2. A thermal management system, as defined in claim 1, wherein said air duct has air duct inlets in a side rear body panel of said vehicle to provide cooling air.

3. A thermal management system, as defined in claim 2, wherein said air duct is comprised of a generally horizontal inlet portion extending from said air duct inlets, a generally vertical duct portion extending from said inlet portion, and a horizontal delivery portion extending from said vertical duct portion to a plenum chamber provided between a vehicle floor and said inlet face of said radiator for distributing air flow to said inlet face.

4. A thermal management system, as defined in claim 3, wherein said plenum chamber further includes turning vanes to direct and turn the air flow to said inlet face of said radiator.

5. A thermal management system, as defined in claim 3, further comprising an auxiliary coolant circuit having an auxiliary radiator parallel and adjacent to said radiator to receive cooling air from said air duct for cooling auxiliary, lower temperature-operating devices.

6. A thermal management system, as defined in claim 5, further comprising a condenser parallel and adjacent to said auxiliary radiator to receive cooling air from said air duct.

* * * * *